US012648061B2

(12) United States Patent
Robinson et al.

(10) Patent No.: US 12,648,061 B2
(45) Date of Patent: Jun. 2, 2026

(54) METHODS AND SYSTEMS FOR SELECTIVELY ACTIVATING LED GROUPS

(71) Applicant: Current Lighting Solutions Canada Inc., Lachine (CA)

(72) Inventors: Frantz Robinson, Lachine (CA); Eden Dubuc, Lachine (CA); Dan Mihai, Pointe-Claire (CA); James Christian Webster, Parma, OH (US)

(73) Assignee: Current Lighting Solutions Canada Inc., Lachine (CA)

( * ) Notice: Subject to any disclaimer, the term of this patent is extended or adjusted under 35 U.S.C. 154(b) by 150 days.

(21) Appl. No.: 18/401,924

(22) Filed: Jan. 2, 2024

(65) Prior Publication Data

US 2024/0334564 A1 Oct. 3, 2024

Related U.S. Application Data

(60) Provisional application No. 63/456,679, filed on Apr. 3, 2023.

(51) Int. Cl.
*H05B 45/20* (2020.01)
*H05B 45/10* (2020.01)
*H05B 45/32* (2020.01)

(52) U.S. Cl.
CPC ............. *H05B 45/20* (2020.01); *H05B 45/10* (2020.01); *H05B 45/32* (2020.01)

(58) Field of Classification Search
CPC ........ H05B 45/20; H05B 45/10; H05B 45/32; H05B 45/48
See application file for complete search history.

(56) References Cited

U.S. PATENT DOCUMENTS

2011/0266961 A1* 11/2011 Tsai ........................ H05B 45/18 315/185 R
2012/0081009 A1* 4/2012 Shteynberg ............ H05B 45/20 315/122

(Continued)

FOREIGN PATENT DOCUMENTS

CA 3 051 521 A 8/2022
CN 112804781 A 5/2021

(Continued)

OTHER PUBLICATIONS

First Office Action issued in connection with corresponding JP Application No. 2024-050634 on Jun. 4, 2025. English machine translation provided.

(Continued)

*Primary Examiner* — Minh Tran
*Assistant Examiner* — Minh D A
(74) *Attorney, Agent, or Firm* — Buckley, Maschoff & Talwalkar LLC

(57) ABSTRACT

Systems, apparatus and methods for selectively activating and/or deactivating one or more groups of light-emitting diodes (LEDs) of a luminaire. In an embodiment, a multi-LED luminaire includes a detection and control circuit, a first light emitting diode (LED) Group, a second LED Group connected in series to the first LED Group, and a first switch operably connected across the second LED Group. The detection and control circuit detects either a power sequence or a dimming sequence and, in response to detection of the power sequence or to the dimming sequence, operates to close the first switch to short-out the second LED Group such that no light is emitted from the second LED Group, operate to open the first switch to power the second LED Group to emit light along with the first LED Group, or (Continued)

operate the switch in a manner to alter the light output of at least one of the first LED Group and the second LED Group.

15 Claims, 5 Drawing Sheets

(56) References Cited

U.S. PATENT DOCUMENTS

| | | | | |
|---|---|---|---|---|
| 2014/0184081 | A1 | 7/2014 | Yeh et al. | |
| 2014/0203716 | A1 * | 7/2014 | Tao | H05B 45/44 315/186 |
| 2020/0107421 | A1 * | 4/2020 | Konishi | H05B 45/50 |

FOREIGN PATENT DOCUMENTS

| | | | |
|---|---|---|---|
| JP | 2012-502500 | A | 1/2012 |
| JP | 2019-057696 | A | 4/2019 |

OTHER PUBLICATIONS

Extended European Search Report dated Aug. 1, 2024 with was issued in connection with EP24166638. 7.

Canadian Office Action dated Mar. 12, 2025 which was issued in connection with Canadian Application No. 3,233,588.

Canadian Office Action dated Dec. 23, 2025 which was issued in connection with Canadian Application No. 3,233,588.

Notice of Reasons of Refusal issued in connection with corresponding JP Application No. 2024-050634 on Jan. 27, 2026, English machine translation provided.

* cited by examiner

METHODS AND SYSTEMS FOR SELECTIVELY ACTIVATING LED GROUPS

CROSS REFERENCE TO RELATED APPLICATION

This application claims the benefit of U.S. Provisional Patent Application No. 63/456,679 filed on Apr. 3, 2023, the contents of which provisional application are hereby incorporated by reference for all purposes.

BACKGROUND

In many lighting situations there is often a need to change the spectral output of a lighting device. For example, for applications such as horticultural lighting it may be desirable to change the color of the emitted light for a variety of different reasons. When using a horticultural luminaire capable of emitting different color light, customers will often desire certain colors from the color spectrum such as far red to enhance flowering and vegetative growth. However, the customers may not wish the horticultural luminaire to emit far red light all the time. Instead, these customers may wish to be able to selectively turn Off and/or turn On the far red light in accordance with a schedule.

Thus, it would be desirable to provide systems and methods capable of selectively activating and/or deactivating a plurality of light-emitting diode (LED) groups.

SUMMARY

Presented herein are systems, methods, and apparatus for selectively activating and/or de-activating one or more light-emitting diode (LED) groups of a multicolor luminaire to obtain different desired color light emissions.

An aspect relates to a multi-LED luminaire that includes a detection and control circuit, a first light emitting diode (LED) Group, a second LED Group, and a first switch. In some embodiments, the first LED Group is operably connected to the detection and control circuit, the second LED Group is operably connected to the detection and control circuit and connected in series to the first LED Group, and the first switch is operably connected across the second LED Group. In some implementations, the detection and control circuit detects one of a power sequence or a dimming sequence. In response to detection of the power sequence or to the dimming sequence, the detection and control circuit either closes the first switch to short-out the second LED Group such that no light is emitted from the second LED Group, or opens the first switch to power the second LED Group to emit light along with the first LED Group, or operates the switch in a manner to alter the light output of at least one of the first LED Group and the second LED Group.

In some implementations the detection and control circuit may be a microcontroller or a logic circuit, and may include a sensing component operably connected, for example, to the microcontroller. The sensing component may be one of a voltage detection circuit, a current detection circuit, a temperature sensor, and a light output detection circuit. In addition, the first switch may be one of a relay, a transistor, a switching device, a resistor, or a specially designed semiconductor device. In some implementations the first LED Group includes LEDs operable to emit light of a first color and the second LED Group includes LEDs operable to emit light of a second different color. In some implementations, an LED driver circuit may be operably connected to the detection and control circuit, and the LED driver circuit, the detection and control circuit, the first LED Group, the second LED Group, the switch and the power sensing portion may be operably connected together on a printed circuit board (PCB). In some other implementations, the LED driver circuit, the detection and control circuit, the first LED Group, the second LED Group, the switch and the power sensing portion may be separate components operably connected together via luminaire wiring.

In some embodiments, the detection and control circuit may detect one of the power sequence or the dimming sequence via the sensing component. In addition, the detection and control circuit may operate on a predetermined schedule, which may include closing the first switch to short-out the second LED Group such that no light is emitted from the second LED Group, or opening the first switch to power the second LED Group to emit light, or operating the switch in a manner to alter the light output of the first LED Group and of the second LED group.

In some implementations, a third LED Group may be connected in series to the second LED Group, and a second switch may be connected across the third LED Group and operably connected to the detection and control circuit. In such an embodiment, the detection and control circuit may detect one of a power sequence or a dimming sequence, and then in response to detecting the power sequence or the dimming sequence, operate to close at least one of the first switch or the second switch to short-out the second LED Group and/or to short out the third LED Group such that no light is emitted from one of the second LED Group and/or the third LED Group, or may open at least one of the first switch and the second switch to power the second LED Group and/or to power the third LED Group to emit light, or may operate the first switch and the second switch in a manner to alter the light output of the first LED Group, the second LED Group and the third LED Group.

Another aspect pertains to a method for selectively activating and/or deactivating one or more groups of light-emitting diodes (LEDs) of a luminaire. The luminaire may include a detection and control circuit detecting a power sequence from an LED driver circuit, then transmitting, in accordance with the power sequence, a control signal to close a first switch to short-out a second LED Group such that no light is emitted from the second LED Group, and transmitting, in accordance with the power sequence, a second control signal to open the first switch to power the second LED Group to emit light along with a first LED Group.

In some embodiments, the first LED Group may include LEDs operable to emit light of a first color and the second LED Group may include LEDs operable to emit light of a second different color. In some aspects, a third LED Group may be operably connected in series to the second LED Group, and a second switch may be connected across the third LED Group and operably connected to the detection and control circuit, and the process may then also include the detection and control circuit detecting a further power sequence, transmitting a control signal to close at least one of the first switch or the second switch to short-out the second LED Group and/or to short out the third LED Group such that no light is emitted from one of the second LED Group and/or the third LED Group, and transmitting a control signal to open at least one of the first switch and the second switch to power the second LED Group and/or to power the third LED Group to emit light. In addition, the third LED Group may include LEDs operable to emit light of a third color that is different from the first color emitted by the first LEDs of the first LED Group and different from the second color emitted by the second LEDs of the second LED Group.

In yet another aspect, presented is a method for selectively activating and/or deactivating one or more groups of light-emitting diodes (LEDs) of a luminaire. The method may include detecting, by a detection and control circuit, a dimming sequence received from an LED driver circuit, and then transmitting, by the detection and control circuit in accordance with the dimming sequence, a dimming control signal to operate a first switch in a manner to alter the light output of at least one of LEDs of a first LED Group and LEDs of a second LED group. In some implementations, the dimming control signal may cause one of rapid activation and deactivation of the first switch or shorting a resistor operatively connected to an LED Group. In addition, the rapid activation may be accomplished by one of pulse width modulation (PWM), pulse frequency modulation (PFM), or pulse density modulation (PDM) of the dimming control signal.

BRIEF DESCRIPTION OF THE DRAWINGS

Features and advantages of some embodiments of the present disclosure, and the way such embodiments are accomplished, will become more readily apparent upon consideration of the following detailed description taken in conjunction with the accompanying drawings, which illustrate exemplary implementations and are not necessarily drawn to scale, wherein.

DETAILED DESCRIPTION

Figure 1:
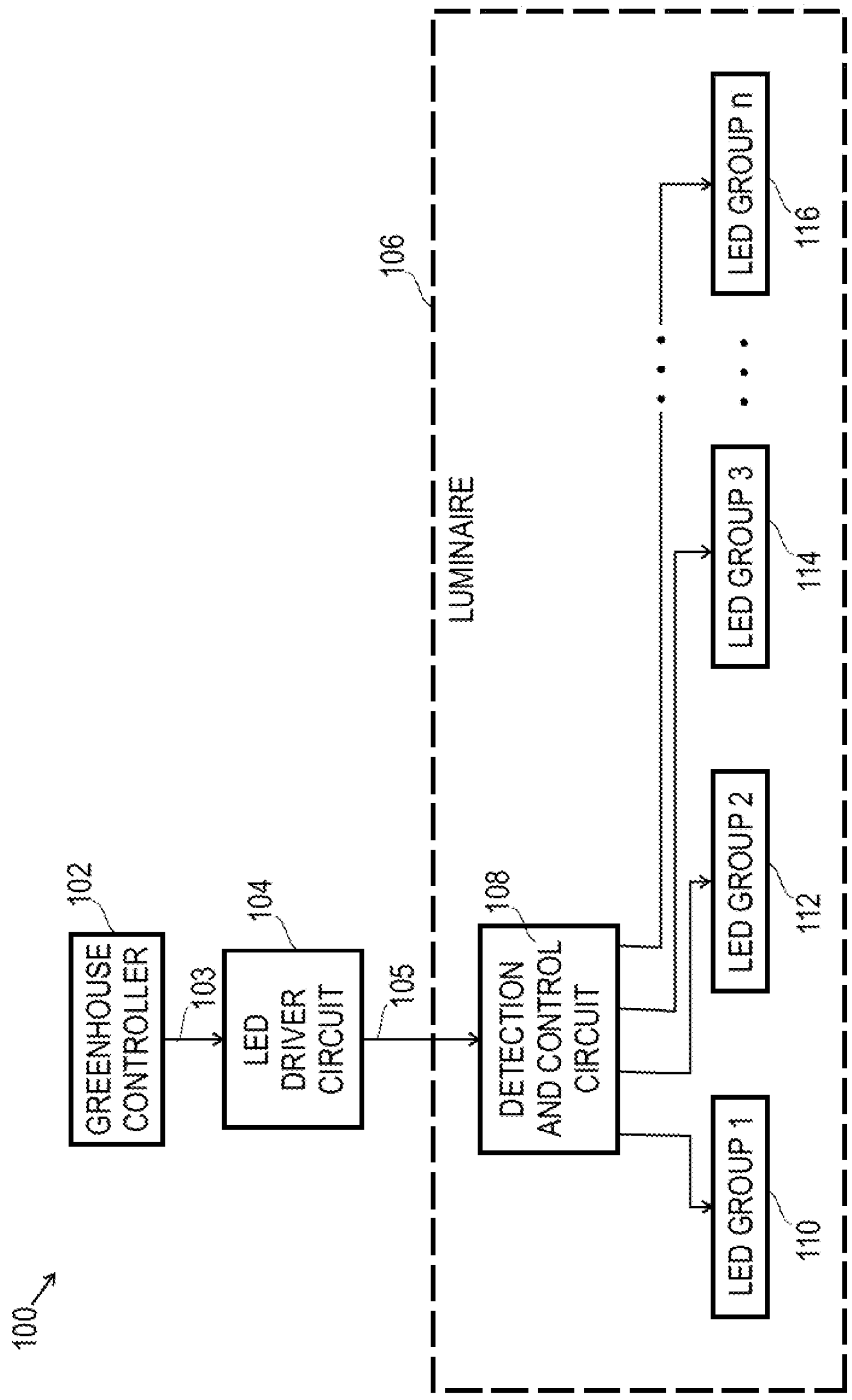
FIG. 1 is a schematic block diagram depicting a multicolor lighting system in accordance with some embodiments.

Reference will now be made in detail to various novel embodiments and/or implementations, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth to provide a thorough understanding of the various embodiments, but some or all of the embodiments may be practiced without some or all of the specific details. In other instances, well-known methods or processes, procedures, components and/or circuits have not been described in detail so as not to unnecessarily obscure novel aspects and/or embodiments.

In general, and for the purpose of introducing concepts of novel embodiments described herein, provided are systems and methods for selectively activating and/or deactivating one or more groups of light-emitting diodes (LEDs) of a luminaire. In some embodiments, a detection and control circuit detects a powering sequence on the output of an LED driver circuit and then controls one or more switches in a manner to activate and/or deactivate and/or dim one or more LED groups of the luminaire. The detection and control circuit may be, for example, a microcontroller which controls one or more transistors (or switches) operable to short circuit one or more groups of LEDs, and in some implementations the detection and control circuit and the switches are provided on a printed circuit board (PCB) of the luminaire. An exemplary powering sequence may include the following pattern: energize the luminaire for five (5) seconds; de-energize the luminaire for 5 seconds; and then turn the luminaire On again for an extended period of time. In this exemplary powering sequence, the detection and control circuit (e.g., a microcontroller) first detects the specific sequence provided by a LED driver circuit and next may activate a transistor to short circuit a desired group of LEDs. In some embodiments, the powering sequence may be performed via power relays on the input side of the LED driver circuit, while in other implementations a dimming signal may be sent to the LED driver circuit that affects the power transmitted to the LEDs. Thus, some implementations include a detection and control circuit operable to detect a power sequence and then to activate, deactivate and/or dim multiple LED groups wherein the detection and control circuit may also be integrated directly onto the LED PCB.

Accordingly, in embodiments of a multicolor luminaire disclosed herein a detection and control circuit and one or more switches are included on the printed circuit board (PCB) of the multicolor luminaire. The detection and control circuit functions to control the switches to activate and/or deactivate at least one light-emitting diode (LED) group. In some implementations, the detection and control circuit detects a power sequence (for example, a specific timing of an On/Off sequence) and then interprets the power sequence to selectively activate, or selectively deactivate, or selectively alter or dim, one or more LED color groups of the multicolor luminaire. For example, the power sequence might cause the multicolor luminaire to be turned On for five seconds and then Off for five seconds and then to immediately turn On, and thus the detection and control circuit will have interpreted the power sequence in a predefined manner such that the luminaire operates in that manner.

In an embodiment, the detection and control circuit of an LED luminaire interprets a received signal to open a circuit interrupt (or switch), and by opening the circuit (interrupting power) the current is then forced to pass through a far-red LED group to thus activate the LEDs of that far-red LED group. Continuing with this example, receipt of a second given power sequence causes the detection and control circuit to close the switch which short-circuits the far-red LED group and deactivates the emission of far-red light. As mentioned above, in some embodiments the PCB of the multicolor luminaire includes multiple LED color groups wherein the LED color groups are connected in series. Thus, in some implementations a serial string of multiple LED color groups may be driven by a LED driver voltage in the range of, for example, 150 Volts (V) to 300V. It should be understood that even if one of the LED color groups is short circuited (and thus deactivated), many commercially available and/or specially designed LED driver circuits will still be able to drive the remaining LED color groups on the serial string because the voltage requirement for each LED color group would still be in the nominal range of the LED driver circuit. Consequently, in many cases the use of a detection and control circuit in accordance with this disclosure does not require any changes to existing LED driver circuits. In addition, embodiments may utilize standard or off-the-shelf LED driver circuits that are low cost and easily replaceable. Embodiments disclosed herein, however, do require an appropriate detection and control circuit (which may be a microcontroller) added to the multicolor luminaire circuit along with appropriate electrically controllable switches (or short-circuit components) to force current to flow through one or more desired LED color groups and/or to shunt current away from (short circuit) one or more other LED color groups.

For example, in many greenhouse facilities that employ LED horticultural luminaires, there is a "greenhouse controller" (or industrial control automation computer) that may be programmed by a user to control the light output (e.g., On or Off or alter, such as dim) of different multicolor luminaires within the greenhouse facility. A user may be able to manually program the greenhouse controller to generate a timing sequence to illuminate the various luminaires in a selected greenhouse in a particular order and/or at a particular light output intensity. Conventional tunable light fixture systems typically require a specific type of greenhouse controller to control the LED horticultural luminaires so that they function correctly, which may increase costs and hinder flexibility. In contrast, embodiments of the multi light-emitting diode (multi-LED) luminaires disclosed herein may utilize a standard controller (or "off-the-shelf" controller) which may be capable of communicating with various types of greenhouse controllers, which may reduce costs and increase flexibility for greenhouse facility managers.

Thus, continuing with the greenhouse example, to take advantage of the apparatus and systems disclosed herein, a greenhouse controller may be programmed to generate a desired power sequence that can be interpreted by a detection and control circuit (e.g., a microcontroller) on a multicolor, multi-LED luminaire. For example, an On/Off power sequence schedule for one or more predetermined or selected periods of time may be interpreted by the microcontroller to activate or deactivate or alter the light output (for example, dim) a given LED color group of a multicolor luminaire.

In some implementations, the user does not have to remember the sequence that corresponds to a desired activation of LED color groups because the controller may be capable of accepting high-level commands from the user. For example, a high-level command entered by a user may be interpreted by an interpretive program running on the controller to generate the required power sequence. Thus, a greenhouse controller may provide a graphical user interface (GUI) on a display screen (such as a touchscreen) at a greenhouse facility that the user may utilize to select a desired high-level command from a list of such commands. The entry or selection by the user of a high-level command appearing on the touchscreen such as "activate far-red lighting for the entire day!" may cause the controller to send an appropriate power sequence to the multicolor, multi-LED luminaire which interprets the power sequence to activate the far-red LED's of a far-red LED group for (12) twelve hours. Alternatively, in some implementations a lookup table may be provided that the user or manager of an industrial facility, for example, can utilize to select an appropriate or desired power sequence to obtain the desired activation of the LED color groups.

In another example, a controller may send a power signal schedule of "dimming-high" followed by "dimming-low" to a power supply unit (PSU) of a luminaire. In embodiments disclosed herein, such a schedule would be appropriately interpreted by the multi-LED luminaire detection and control circuit to selectively activate (or deactivate or alter the light output of) a desired LED color group or a plurality of LED color groups.

In some embodiments, a controller may transmit a similar type of power signal, called a "dimming signal," to a multicolor, multi-LED luminaire instead of a sequence of On and Off signals. For example, many power supplies used by horticultural luminaires are typically controlled by a wired (or wireless) dimming control system, such as a zero Volt to ten Volt (0V-10V) system (but it should be understood that many other protocols, such as DALI, DMX and PWM exist for wired dimming and lighting control, and that other wireless communication protocols, such as Bluetooth Low Energy (BLE) and Zigbee, could be utilized for wireless communications and/or wireless lighting control). Such a dimming control system can be exploited by the detection and control circuit on the PCB of the multicolor, multi-LED luminaire by interpreting a sequence of dimming signals (or combination of dimming signals and power signals) to selectively activate or deactivate a desired LED color group (e.g., by shorting). In some embodiments, the detection and control circuit will be physically located on the printed circuit board (PCB) of the multicolor, multi-LED horticultural luminaire (which also accommodates the LED color groups), and in some implementations the detection and control circuit may also be operably connected on the direct current (DC) side of the power supply unit (PSU).

In some alternative embodiments, the light output of a given LED color group could be selectively altered (such as dimmed) instead of being fully activated or fully deactivated. Dimming of an LED color group can be accomplished by a rapid switching of its associated short-circuiting switch such as by pulse width modulation (PWM). In particular, rapidly switching the shorting switch (i.e., switching at a very high frequency) from an open to a closed state and vice versa can effectively dim one of the LED color groups. It should be understood that other methods of dimming a selected LED color group may also be possible such as opening or shorting a resistor that is connected in series or in parallel with an LED group.

In yet another alternative embodiment, a dimming signal could be transmitted to the multicolor luminaire and the resulting sequence would be interpreted by the controller or microcontroller to short out and thus to deactivate an LED color group, or to activate an LED color group, or to dim an LED color group. For example, a signal sent to the PSU of the luminaire may be in the form of a dimming schedule (such as eighty percent (80%) dimming for five seconds followed by twenty percent (20%) dimming for five seconds). In such manner, the detection and control circuit, such as a microcontroller, is always powered (i.e., receiving power from the PSU) and thus can better perform its function of shorting-in or shorting-out a given LED color group.

Many of the examples disclosed herein involve a "greenhouse controller" or "controller" or "microprocessor," but it should be understood that many other devices could be utilized to control the lighting sequence of an LED luminaire. For example, a Programmable Logic Controller (PLC) or relay logic circuitry having push buttons connected to input lines that trigger various power sequences that drive the LEDs of the luminaire could be utilized. Once skilled in the art could also devise other types of control circuitry that a user could program and/or otherwise utilize to control the lighting sequence of the LED luminaire.

Also, one skilled in the horticultural lighting field understands that LEDs that emit light in the far-red spectrum may be utilized for specific purposes, such as to control the flowering of strawberries. In addition, white LED color groups might be provided on the multicolor luminaire to substitute for sunlight, but if sunlight is plentiful inside the greenhouse and deliverable to the plants then white LEDs may not be required. In addition, a blue LED color group may be provided within a multicolor, multi-LED luminaire for use, for example, to control the photo-morphology and coloration of plants at a specific growth stage, for example. Thus, it should be understood that although the discussions and concepts herein cite selectively activating or deactivating a far-red LED group, or dimming a far-red LED group, such concepts and discussions also apply to any type of LED color group which may be used in a multicolor, multi-LED luminaire which may be used, for example, in a horticultural environment.

In addition, the present concepts may also be applicable to selectively activating more than one LED color group at the same time or at different times or different intervals. For example, if a horticultural luminaire can emit all three of: (1) ultraviolet light, (2) white light, and (3) far-red light, the present concepts concerning providing signals to a power supply can be used to control any or all of the various LED color groups of this kind of luminaire. Accordingly, the concepts disclosed herein may be implemented in a greenhouse facility that includes multicolor, multi-LED luminaires that are not presently configured for dimming from the greenhouse controller. In such case, a raw sequence of Power On/Power Off signals may be utilized to send a control signal to the power supply unit (PSU) of the multicolor, multi-LED luminaire. In other embodiments having an available dimming channel between the greenhouse controller and the PSU of the multicolor, multi-LED luminaire, then that dimming channel can also be used to send a signal to control the LED color groups.

A suitable detection and control circuit (such as a microcontroller) for interpreting signals in the manner described herein to control light emissions from a multicolor, multi-LED luminaire may include a temporary electrical storage device (e.g., a buffer capacitor or a battery) so that sufficient power is available to perform its function(s) even while the PSU to the multicolor, multi-LED luminaire in an Off state (at least for a short period of time). In particular, in some embodiments at least low power is required to run a real-time clock so that the detection and control circuit can measure time precisely while the LED luminaire is turned Off to ensure proper functioning. In some other embodiments, instead of using a temporary electrical storage device, the detection and control circuit includes a non-volatile memory and during operation saves and then restores current operating states as necessary. The detection and control circuit may require an analog input that can sense either voltage or current and may also include a digital output capable of driving a switch, such as a metal-oxide-semiconductor field-effect transistor (MOSFET) or the like. One skilled in the art recognizes that many types of circuits have such functionality and can be acquired commercially at low cost.

One skilled in the art would also recognize that embodiments of the multi-LED luminaires disclosed herein may include LEDs that are of the same color and that may be used for other purposes and/or applications. For example, an implementation may include multiple LED groups having the same color but that include different lens elements which cover all or a portion of one or more of the LED groups to generate different color lighting. Such multi-LED luminaires may provide, for example, decorative lighting for a home or may be used to light a portion of a stage in a theater.

FIG. 1 is a schematic diagram depicting a multicolor lighting system 100 in accordance with some embodiments. A greenhouse controller 102 is operably connected to an LED driver circuit 104 which in turn is operably connected to a detection and control circuit 108 of a multicolor luminaire 106. The LED driver circuit 104 is operable to deliver power to the multicolor luminaire 106 which includes the detection and control circuit 108 operably connected to a plurality (n) of LED groups, including LED Group1 110, LED Group2 112, LED Group 3, 114 and LED Group n 116. In some embodiments the LED driver 104 may be integrated with the multi-color, multi-LED luminaire 106 as shown in FIG. 1, or may be remote or separate therefrom.

Referring again to FIG. 1, in some implementations the arrow 103 denotes a power connection into the LED driver 104 (power "IN") whereas arrow 105 denotes power coming out of the LED driver 104 (power "OUT"). In some embodiments, the LED driver 104 is operably connected to (either electrically or wirelessly) a dimming control system (not shown) which may be located in between the greenhouse controller 102 and the LED driver circuit 104. Thus, in some implementations the LED driver circuit 104 may be operable to wirelessly receive control signals from the dimming control system. As discussed previously, such a dimming control system may be a 0-10V dimming interface, and thus the LED driver circuit 104 would receive a dimming signal from the dimming control system and then control the output to the multicolor, multi-LED luminaire 106 based on the dimming signal. As shown, the multi-LED luminaire 106 includes the detection and control circuit 108 (which may be a microcontroller) that is operable to interpret the LED driver circuit 104 output to selectively activate or deactivate (or dim) one or more of the different colored LED groups 110-116 on the PCB board of the multicolor, multi-LED luminaire 106.

Figure 2A:
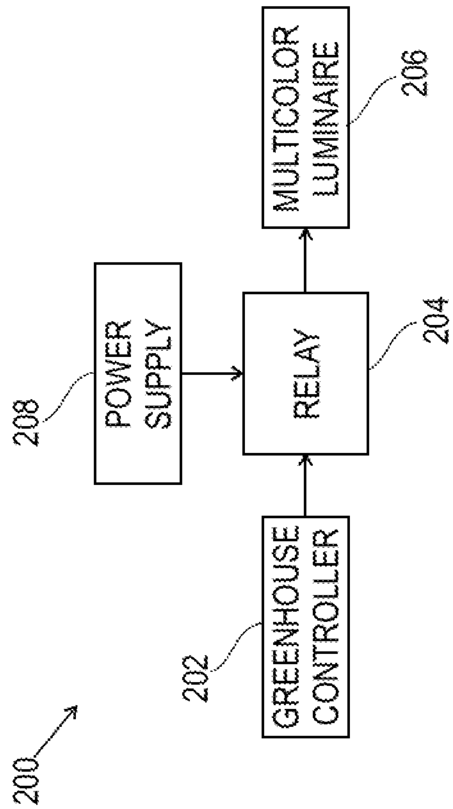
FIGS. 2A and 2B depict two multicolor lighting system configurations having different arrangements of components in accordance with embodiments of the disclosure.
Figure 2B:
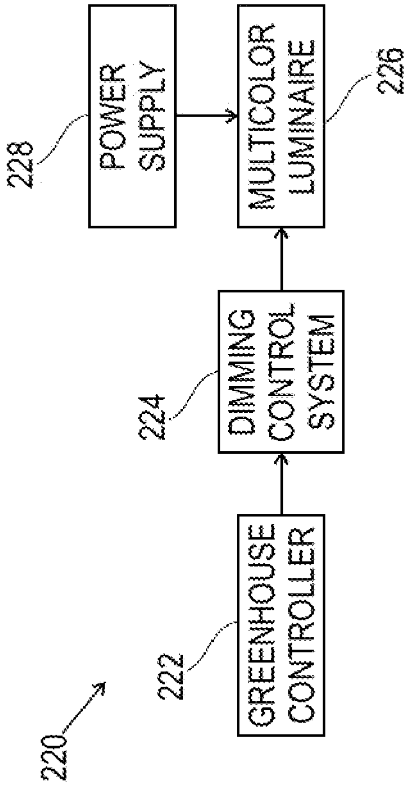

FIG. 2A and FIG. 2B depict two different multicolor lighting system configurations 200 and 220 (having different arrangements of components) in accordance with the disclosure. The multicolor lighting system configuration 200 of FIG. 2A includes a greenhouse controller 202 operably connected to a relay 204 which relay is also operably connected to both a multicolor, multi-LED luminaire 206 and to a power supply 208. The greenhouse controller 202 is generally utilized by a user to turn the multicolor, multi-LED luminaire 206 On or Off according to a schedule, wherein the multicolor luminaire may be located within a greenhouse. At this point it should be understood that, although the lighting system shown in FIG. 2A depicts only one relay 204 and one luminaire 206, in a practical horticultural multicolor lighting system a plurality of such components would be utilized because in many applications a plurality of multicolor luminaires would be placed within the greenhouse to provide lighting to various plants. The same may be true of other applications wherein a plurality of multicolor luminaires are utilized.

Referring again to the lighting system configuration shown in FIG. 2A, the greenhouse controller 202 is operable to control a relay 204 that powers the multicolor, multi-LED luminaire 206 On or Off. In this embodiment, the relay 204 accepts power from a power supply 208, which may be a power supply unit (PSU) or a circuit breaker connected to a mains power supply, which power sources may be conditioned by a LED driver circuit (not shown) before being transmitted to the relay 204. As described above, in some embodiments the greenhouse controller 202 transmits instructions to the relay 204 to output a power sequence to the multicolor luminaire 206 which is interpreted by a microcontroller (not shown) on a PCB board (not shown) of the multicolor luminaire 206 to activate or deactivate one or more LED color groups (not shown).

FIG. 2B illustrates a second lighting system configuration 220 in accordance with embodiments of the disclosure. The multicolor lighting system 220 includes a greenhouse controller 222 operably connected to a dimming control system 224 (either wired or wirelessly) which is operably connected to the multicolor luminaire 226. As also shown in FIG. 2B, the multicolor luminaire 226 is also operably connected to a power supply 228. In some embodiments, the greenhouse controller 222 transmits dimming control signals to the dimming control system 224 which then operates to control the LED groups of the multicolor luminaire 226. The power supply 228 may be a power supply unit (PSU) or a circuit breaker connected to a mains power supply, and in some implementations the power supply 228 may be conditioned by a LED driver circuit (not shown) before power is transmitted to the multicolor luminaire 226. As mentioned above, the multicolor luminaire 226 includes a detection and control circuit (which may be a microcontroller, not shown) operable to interpret a dimming signal sequence from the dimming control system 224 to selectively activate or deactivate (or dim) selected LED color groups (not shown) that are within the multicolor luminaire.

Figure 3A:
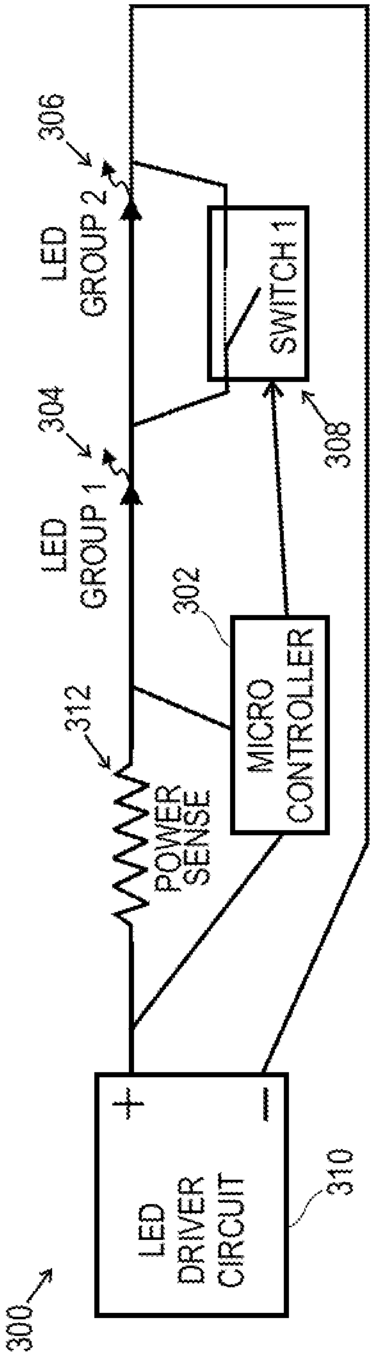
FIGS. 3A, 3B and 3C illustrate three different multicolor luminaire configurations in accordance with some embodiments of the disclosure.
Figure 3B:
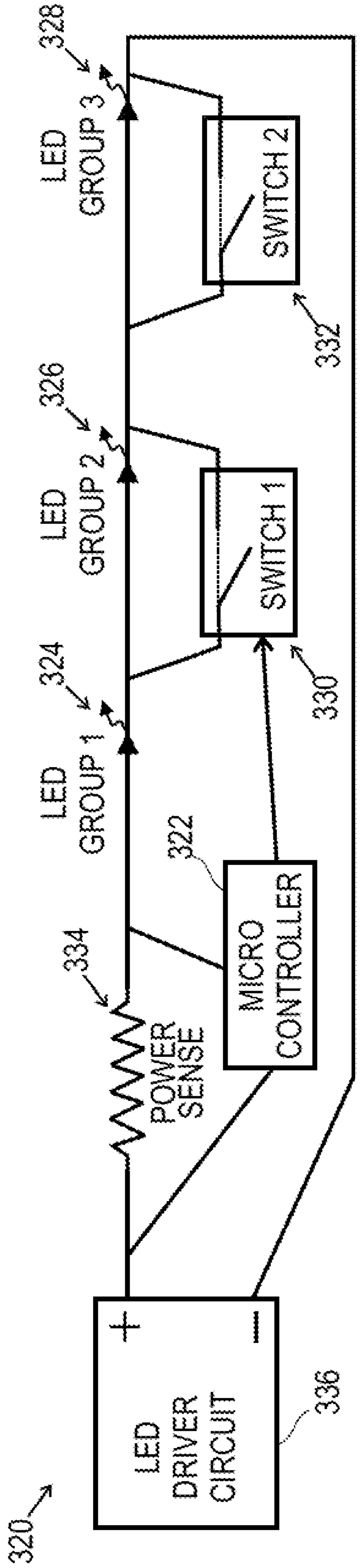
Figure 3C:
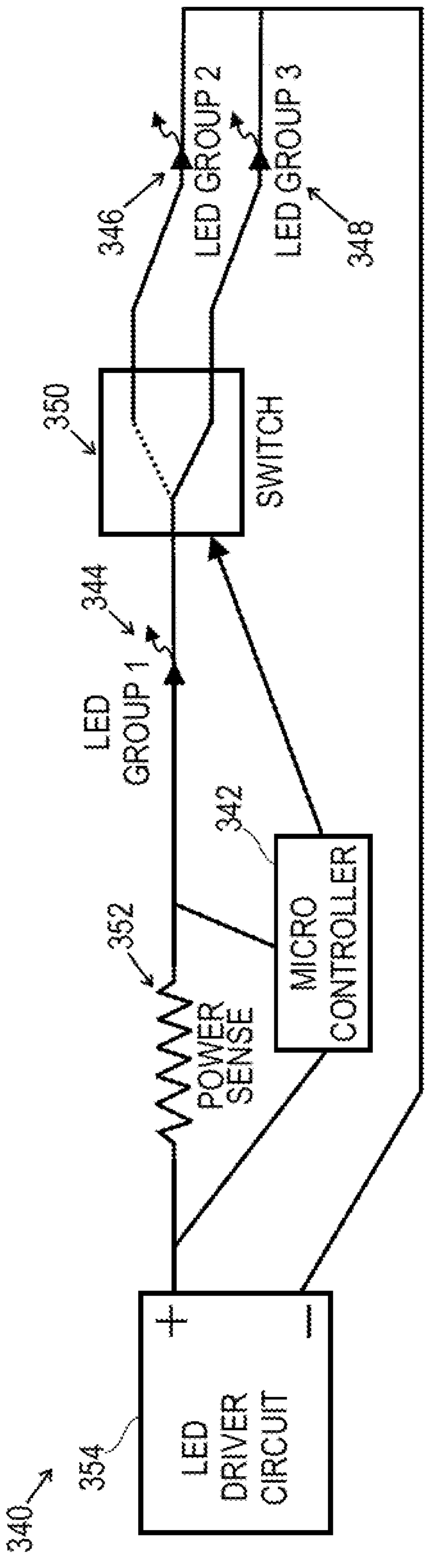

FIGS. 3A, 3B and 3C illustrate three different multicolor luminaire component configurations in accordance with some embodiments. All of the configurations (300, 320 and 340) depicted by FIGS. 3A-3C are agnostic as to whether the input signal to the LED driver circuit (310, 336, 354) sent by a greenhouse controller (not shown) is a power-On/power-Off sequence or is a changing dimming sequence signal that may be received from a dimming control system (not shown).

Turning to FIG. 3A, a multicolor luminaire 300 includes a detection and control circuit 302, such as a microcontroller, located on a printed circuit board (PCB) of the multicolor, multi-LED luminaire along with LED Group1 304, LED Group2 306 and a switch 308. In some embodiments, the LEDs in LED Group1 304 emit light of a different color than the LEDs of LED Group2 306 (while in other embodiments the LEDs may emit the same color light). In addition, LED Group 1 304 and LED Group2 306 are operably connected in series with one another. In some embodiments, the drive circuit 310 is also located on the PCB of the multicolor luminaire 300, but in other implementations it may be a separate component that is not on the PCB. In addition, as shown the microcontroller 302 is operably connected to the LED driver circuit 310 across a power sense component 312 which enables the microcontroller 302 to sense the power levels (e.g., changing Voltage levels or current levels) input by the LED driver circuit 310. The switch 308 is situated across LED Group 2 which may be opened under control of the microcontroller 302 to illuminate LED Group2 (as shown in FIG. 3A) or closed by the microcontroller (not shown) in order to deprive LED Group2 of power (or short-circuit LED Group2) so that the LEDs of LED Group2 do not emit light. In particular, if switch 308 is open then current can flow through LED Group 1 and through LED Group 2 so that both LED Groups are activated and emit light. However, if the switch 306 is closed then LED Group2 is short-circuited or bypassed so that only the LEDs of LED Group1 emit light.

Referring to FIG. 3B, the multicolor luminaire 320 is similar to the multicolor luminaire 300 of FIG. 3A except that it contains an additional LED Group3 328 and an associated switch 332. Accordingly, the multicolor luminaire 320 includes a microcontroller 322 located on a printed circuit board (PCB) of the multicolor luminaire along with LED Group1 324, LED Group2 326 with an associated Switch1 330, and LED Group3 328 with associated Switch2 332. In some embodiments, the LEDs in LED Group1 324 emit light of a different color than the LEDs of LED Group2 326 and/or of LED Group3 328, but other implementations may differ in their LED color arrangements (and/or lack of differences). In addition, LED Group1, LED Group2 and LED Group3 are operably connected in series with one another. In some embodiments, the drive circuit 336 may also be located on the PCB of the multicolor luminaire 320, but in other implementations it may be a separate component. In addition, as shown the microcontroller 322 is operably connected to the LED driver circuit 336 across a power sense component 334 which enables the microcontroller 322 to sense the power levels (e.g., changing Voltage levels or current levels) input by the LED driver circuit 336 to the multicolor, multi-LED luminaire. During operation of the multicolor luminaire 320 the microcontroller 322, upon receipt of an appropriate signal (e.g., different voltage levels or current levels), may function to short-out (or bypass) the LED Group2 326 and/or the LED Group3 328 by closing their associated switches (Switch1 330 and/or Switch2 332) to obtain a desired spectrum of light emitted by the LEDs of LED Group1 in combination with the LEDs of LED Group2 and/or LED Group3. In some situations, it may be desirable to have light emitted only from the LEDs of LED Group1, and thus the microcontroller 322 operates to close both Switch1 330 and Switch2 332 in such a case. In other situations, it may be desirable for light to be emitted from the LEDs of LED Group1 in combination with the LED's of one or both of LED Group2 and LED Group3.

FIG. 3C illustrates a multicolor luminaire 340 having a configuration of LED Group components that differs from FIGS. 3A and 3B in accordance with some embodiments. Specifically, the multicolor luminaire 340 includes a microcontroller 342 located on a printed circuit board (PCB) of the multicolor luminaire 340 along with LED Group1 344, LED Group2 346 and LED Group 348. However, in contrast to the LED Group configurations illustrated in FIGS. 3A and 3B, LED Group2 and LED Group3 are operably connected in parallel with each other and are both operably connected to the same Switch 350. The Switch 350 and LED Group1 are connected in series with each other. As in the configurations discussed above, the LEDs of LED Group1 344 may emit light of a different color than the LEDs of LED Group2 346 and/or of the LEDs of LED Group3 348, but in other implementations these LED Groups may include other combinations of LEDs to provide other color emitting arrangements (or the same color emitting arrangement). The LED driver circuit 354 may also be located on the PCB of the multicolor luminaire 320, but in other implementations it may be a separate component that is not physically located on the PCB. In addition, as shown the microcontroller 342 is operably connected to the LED driver circuit 354 across a power sense component 352 which enables the microcontroller 342 to sense the power levels (e.g., changing Voltage levels or current levels) input by the LED driver circuit 354 to the multicolor luminaire.

Referring again to FIG. 3C, during operation of the multicolor luminaire 340 the microcontroller 342, upon receipt of an appropriate signal (e.g., different voltage levels or current levels), may function to short-out (or bypass) one of LED Group2 326 or LED Group3 328 by switching the Switch 350 to the appropriate position in order to obtain a desired spectrum of light emitted by the LEDs of LED Group1 in combination with one of the LEDs of LED Group2 or the LEDs of LED Group3. It should be understood that other LED Group circuit configurations that include more or less LED Groups connected in series and/or in parallel may be possible and can be readily derived from the disclosed embodiments by a person of ordinary skill in the art.

The multicolor luminaire configurations of FIGS. 3A, 3B and 3C include a power sense component (312, 334, 352), which may be a voltage detection circuit or a current detection circuit, which enables the microcontroller 302 to sense power levels and then control the switches (308, 330, 332, 350) to obtain a desired light output of the various LED Groups. However, other types of sensing components, such as a light output detection circuit, are contemplated for use in multicolor luminaires as part of a detection and control circuit for controlling a switch or switches to obtain a desired light output from one or more LED Groups.

Figure 3D:
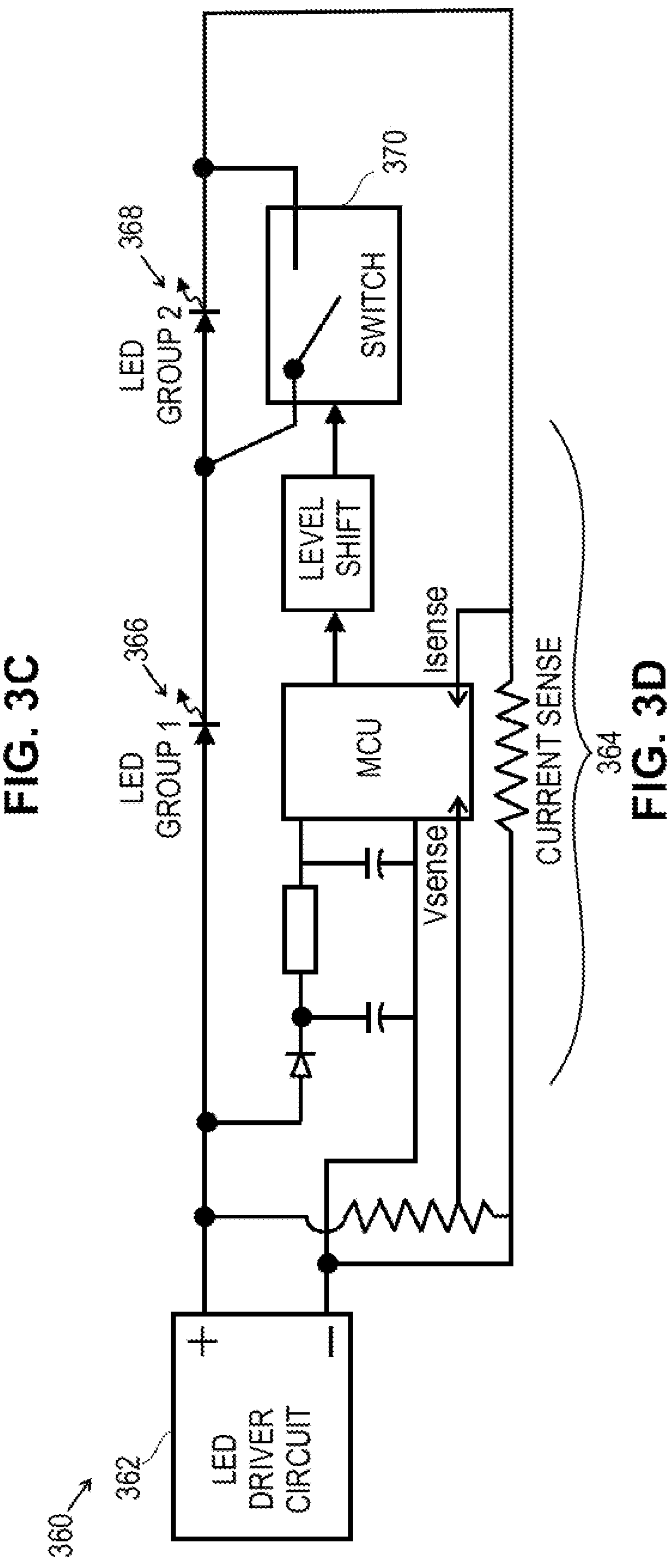
FIG. 3D depicts another multicolor luminaire circuit in accordance with some embodiments of the disclosure.

FIG. 3D illustrates another multicolor luminaire circuit in accordance with some embodiments. Like FIGS. 3A-3C, the configuration of FIG. 3D is agnostic as to whether the input signal to the LED driver circuit 362 sent by a controller (not shown) is a power-On/power-Off sequence or is a changing dimming sequence signal that may be received from a dimming control system (not shown).

Referring to FIG. 3D, the multicolor luminaire 360 includes a detection and control circuit 364 which includes a microcontroller unit (MCU), level shift circuitry, and other electronic components as shown which may be located on a printed circuit board (PCB) along with LED Group1 366, LED Group2 368 and a switch 370. In some implementations, the LEDs in LED Group1 366 emit light of a different color than the LEDs of LED Group2 368 and are operably connected in series with one another. In some embodiments, the drive circuit 362 may be located on the PCB of the multicolor luminaire 300, but in other implementations it may be a separate component that is not on the PCB. The multicolor luminaire 360 may operate in the same or similar manner as the multicolor luminaire 300 of FIG. 3A.

Figure 4:
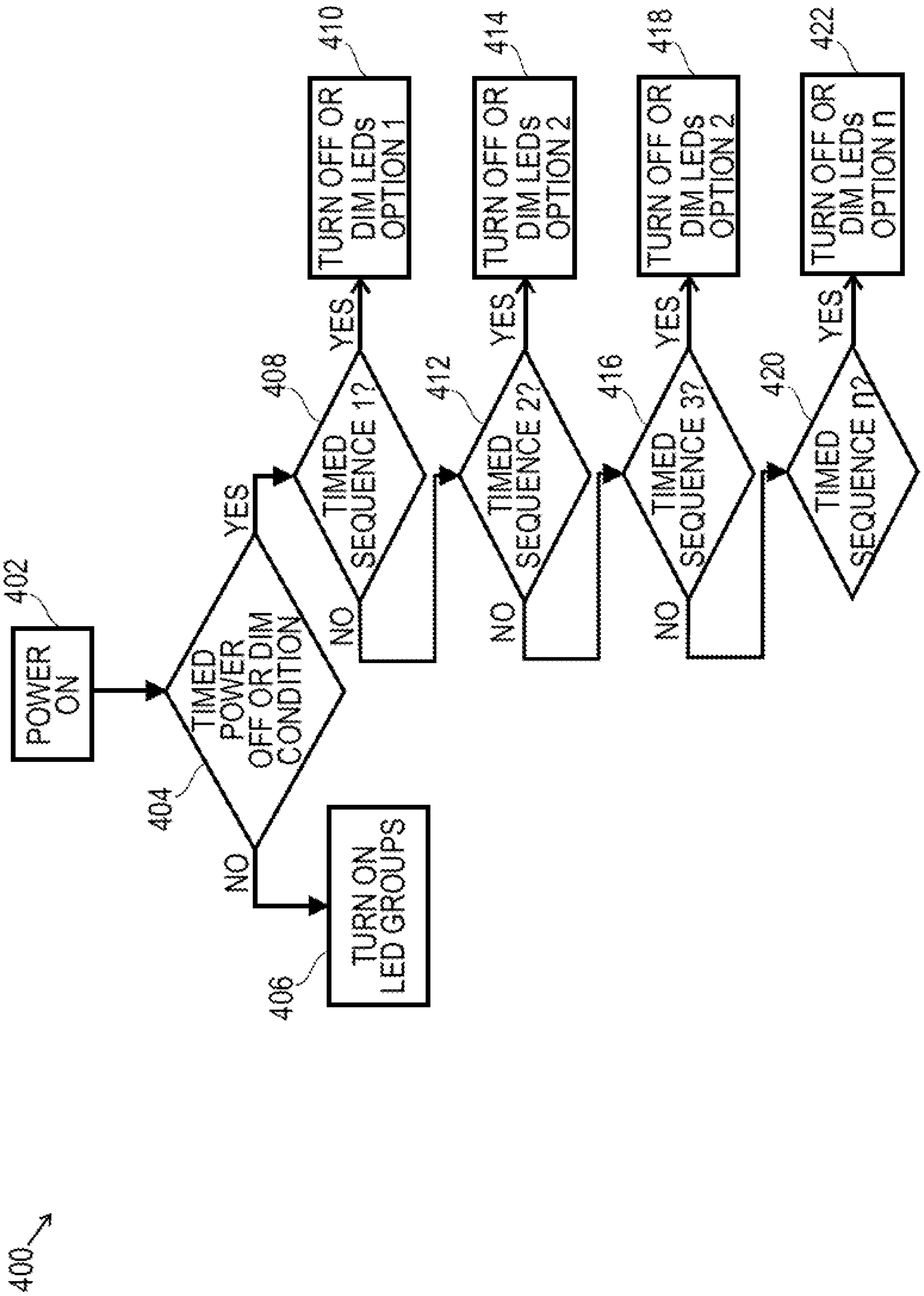
FIG. 4 is a flow chart illustrating how various power sequences or dimming sequences can be interpreted by a microcontroller of a multicolor, multi-LED LED luminaire to provide different color lighting options in accordance with some embodiments of the disclosure.

FIG. 4 is a flow chart 400 illustrating how various power sequences or dimming sequences can be input to and/or interpreted by a controller, such as a microcontroller, of a multicolor, multi-LED luminaire to provide different color lighting options in accordance with some embodiments. Specifically, in some embodiments an industrial control system, which may be a greenhouse controller, transmits 402 a Power On signal which is received by a controller of an LED luminaire. If the greenhouse controller is not operable to provide any of the power sequences (or dimming sequences) required to control the LED Groups of a multicolor, multi-LED luminaire, then the controller would simply turn On 406 all of the LED Groups. But if the greenhouse controller provides a Timed Sequence1 signal 408 then the controller functions to Turn Off or Dim one or more of the LED Groups 410 of the multicolor, multi-LED luminaire for a specified period of time in accordance with that sequence or Option1. If a Timed Sequence 1 signal is not received, but instead a Timed Sequence2 signal is received 412, then the controller functions to Turn Off or Dim one or more of the LED Groups 414 of the multicolor luminaire for a specified period of time in accordance with that sequence or Option2. Accordingly, if a Timed Sequence1 or Timed Sequence2 signal is not received, but instead a Timed Sequence3 signal is received 416, then the controller functions to Turn Off or Dim one or more of the LED Groups 418 of the multicolor luminaire for a specified period of time in accordance with that sequence or Option3. Also, if a Timed Sequence1 signal or Timed Sequence2 signal or Timed Sequence3 signal is not received, but instead a Timed SequenceN signal is received 420, then the controller functions to Turn Off or Dim one or more of the LED Groups 422 of the multicolor luminaire for a specified period of time in accordance with that sequence or OptionN. Thus, there may be many different options or combinations for turning off or dimming various LED Groups for any particular multi-LED luminaire operable to emit light of different colors.

For example, a predefined power sequence designated Option1 may be detected by the controller of the LED luminaire which then activates one or more combinations of LED Groups of the LED multicolor luminaire to emit light for three to seven seconds; upon detection of a power sequence designated Option2, the controller may then activate one or more different combinations of LED Groups to emit light for seven to twelve point five seconds; upon detection of a power sequence designated Option 3, the controller may then activate one or more different or the same combinations of LED Groups for twelve to seventeen seconds; and upon detection of a power sequence designated Option 4, the controller may then activate one or more combinations of LED Groups for seventeen to twenty-three seconds. In addition, a schedule for utilizing any of the options, such as Option1, may include detecting that option every six hours, or every three hours, and the like, and then activating one or more LED Groups as appropriate for the designated amount of time. Of course, many different schedule combinations are possible.

The systems, methods and apparatus disclosed herein are particularly applicable to situations where a user installs a multicolor, multi-LED luminaire containing a plurality of LED color groups (various strings of LEDs of different colors) but wherein the multicolor luminaire is not associated with a multichannel LED driver. In particular, the disclosed systems may be an alternative to systems that utilize a multichannel LED driver and may be particularly suitable for horticultural lighting applications such as the use of multicolor, multi-LED luminaires in a greenhouse environment.

Many of the embodiments described herein rely upon a description of a luminaire having the different LED color groups arranged in series. However, the present disclosure should not be construed as being so limited because the different LED color groups could be placed in parallel on the printed circuit board (PCB) and the microcontroller configured to selectively activate one or more of the LED color groups after receiving the power sequence (or dimming sequence) signal. In another important alternative embodiment, a selected LED color group may not be simply fully deactivated by the microcontroller upon receipt of the power or dimming sequence; instead, power to the selected LED color group might simply be reduced so that it emits lower intensity light. In addition, some or all of the LED Groups of a multi-LED luminaire may not include LED color groups which may depend on the desired application.

The disclosed systems, methods and apparatus may offer several advantages over conventional multicolor lighting systems. For example, a conventional lighting system used in horticultural lighting applications includes high-pressure sodium (HPS) lighting, which cannot provide color or spectral tunability. However, a large amount of horticultural lighting research reveals that different wavelengths of light have different effects and efficacy for growing and/or maintaining plants. To attain optimal spectral output for different plants during different stages of growth, multi-channel luminaires exist which could be used, for example, to optimize plant growth. However, such multichannel luminaires typically require a multi-channel LED driver that adds significant cost and complexity to the luminaire and could even reduce the efficacy of the emitted light. In contrast, the systems, methods and apparatus disclosed herein provide low-cost solutions at a very low drop in efficiency versus a fixed-spectrum system. Furthermore, the disclosed systems, methods and apparatus typically employ different power sequences obtained from relays, and thus a complex control system is not required. Many other advantages may also be apparent to those of skill in the art.

As used herein and in the appended claims, the term "computer" should be understood to encompass a single computer or two or more computers in communication with each other or a computer network or computer system. In addition, as used herein and in the appended claims, the term "processor" should be understood to encompass a single processor or two or more processors in communication with each other. Moreover, as used herein and in the appended claims, the term "memory" should be understood to encompass a single memory or storage device or two or more memories or storage devices. Such a memory and/or storage device may include any and all types of non-transitory computer-readable media, with the sole exception being a transitory, propagating signal.

The flow charts and descriptions thereof herein should not be understood to prescribe a fixed order of performing the method steps described therein. Rather, the method steps may be performed in any order that is practicable. In addition, the flow charts described herein should not be understood to require that all steps or elements be practiced in every embodiment. For example, one or more elements or steps may be omitted in some embodiments.

Although the present disclosure describes specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A multi-LED multicolor luminaire for obtaining different desired color light emissions comprising:
- a detection and control circuit;
- a first light emitting diode (LED) Group operable to emit light of a first color and operably connected to the detection and control circuit;
- a second LED Group operable to emit light of a second color and operably connected to the detection and control circuit and wherein the second LED Group is connected in series to the first LED Group; and
- a first switch operably connected across the second LED Group;
  - wherein the detection and control circuit is operable to:
  - detect one of a power sequence or a dimming sequence for controlling the photo-morphology and coloration of plants at specific growth stages; and
  - in response to detection of the power sequence or to the dimming sequence, operates to at least one of:
    - close the first switch to short-out the second LED Group such that no light of the second color is emitted from the second LED Group,
    - open the first switch to power the second LED Group to emit light of the second color along with light of the first color from the first LED Group, or
    - operate the switch in a manner to alter the light output of at least one of the first LED Group and the second LED Group.

2. The apparatus of claim 1, wherein the detection and control circuit comprises one of a microcontroller or a logic circuit.

3. The apparatus of claim 1, wherein the detection and control circuit comprises a sensing component operably connected to a microcontroller.

4. The apparatus of claim 3, wherein the sensing component comprises one of a voltage detection circuit, a current detection circuit, a temperature sensor, and a light output detection circuit.

5. The apparatus of claim 3, wherein the detection and control circuit detects one of the power sequence or the dimming sequence via the sensing component, and wherein the detection and control circuit operates on a predetermined schedule to one of:
- close the first switch to short-out the second LED Group such that no light is emitted from the second LED Group,
- open the first switch to power the second LED Group to emit light of the second color, or
- operates the switch in a manner to alter the light output of the first LED Group and of the second LED group.

6. The apparatus of claim 1, wherein the first switch comprises one of a relay, a transistor, a switching device, a resistor, or a specially designed semiconductor device.

7. The apparatus of claim 1, further comprising an LED driver circuit operably connected to the detection and control circuit.

8. The apparatus of claim 7, wherein the LED driver circuit, the detection and control circuit, the first LED Group, the second LED Group, the switch and the power sensing portion are operably connected together on a printed circuit board (PCB).

9. The apparatus of claim 7, wherein the LED driver circuit, the detection and control circuit, the first LED Group, the second LED Group, the switch and the power sensing portion are separate components operably connected together via luminaire wiring.

10. The apparatus of claim 1, further comprising:
- a third LED Group operably connected in series to the second LED Group; and
- a second switch connected across the third LED Group and operably connected to the detection and control circuit;
- wherein the detection and control circuit is operable to:
- detect one of a power sequence or a dimming sequence; and
- in response to detecting the power sequence or the dimming sequence, operates to one of:
- close at least one of the first switch or the second switch to short-out the second LED Group and/or to short out the third LED Group such that no light is emitted from one of the second LED Group and/or the third LED Group,
- open at least one of the first switch and the second switch to power the second LED Group and/or to power the third LED Group to emit light, or operate the first switch and the second switch in a manner to alter the light output of the first LED Group, the second LED Group and the third LED Group.

11. A method for selectively activating and/or deactivating one or more groups of light-emitting diodes (LEDs) of a multi-color luminaire to obtain different desired color light emissions for controlling the photo-morphology and coloration of plants at specific growth stages comprising:

detecting, by a detection and control circuit, a power sequence from an LED driver circuit;

transmitting, by the detection and control circuit in accordance with the power sequence, a control signal to close a first switch to short-out a second LED Group operable to emit light of a second color such that no light of the second color is emitted from the second LED Group; and transmitting, by the detection and control circuit in accordance with the power sequence, a second control signal to open the first switch to power the second LED Group to emit light of the second color along with a first LED Group emitting light of a first color.

12. The method of claim 11, wherein a third LED Group is operably connected in series to the second LED Group, and wherein a second switch is connected across the third LED Group and is operably connected to the detection and control circuit, and further comprising:

detecting, by the detection and control circuit, a further power sequence;

transmitting, by the detection and control circuit, a control signal to close at least one of the first switch or the second switch to short-out the second LED Group and/or to short out the third LED Group such that no light is emitted from one of the second LED Group and/or the third LED Group; and transmitting, by the detection and control circuit, a control signal to open at least one of the first switch and the second switch to power the second LED Group to emit light of the second color and/or to power the third LED Group to emit light of a third color different from the light of the first color and light of the second color.

13. A method for selectively activating and/or deactivating one or more groups of light-emitting diodes (LEDs) of a multi-color luminaire to obtain different desired color light emissions for controlling the photo-morphology and coloration of plants at specific growth stages comprising:

detecting, by a detection and control circuit, a dimming sequence received from an LED driver circuit;

transmitting, by the detection and control circuit in accordance with the dimming sequence, a dimming control signal to operate a first switch in a manner to alter the light output of at least one of LEDs of a first LED Group emitting light of a first color and LEDs of a second LED group emitting light of a second color.

14. The method of claim 13, wherein the dimming control signal causes one of rapid activation and deactivation of the first switch or shorting a resistor operatively connected to an LED Group.

15. The method of claim 14, wherein the rapid activation is accomplished by one of pulse width modulation (PWM), pulse frequency modulation (PFM), or pulse density modulation (PDM) of the dimming control signal.

* * * * *